United States Patent [19]

Miyoshi

[11] 4,393,278

[45] Jul. 12, 1983

[54] TELEPHONE SECURITY SYSTEM

[76] Inventor: Allan M. Miyoshi, 6493 Ellenview Ave., Canoga Park, Calif. 91307

[21] Appl. No.: 181,993

[22] Filed: Aug. 26, 1980

[51] Int. Cl.³ .............................................. H04M 3/38
[52] U.S. Cl. .................................. 179/84 C; 179/2 A
[58] Field of Search .................. 179/2 A, 18 D, 84 R, 179/84 C, 89, 6.07

[56] References Cited

U.S. PATENT DOCUMENTS 3,654,396 4/1972 Biezeveld ........................ 179/18 D
3,784,721 1/1974 Kilby ............................. 179/84 C X
3,829,616 8/1974 Blouch ................................ 179/2 A
4,006,316 2/1977 Bolgiano ........................ 179/2 A X Primary Examiner—Joseph A. Popek
Attorney, Agent, or Firm—Ralf H. Siegemund

[57] ABSTRACT

A unit is interposed between a telephone outlet and the set to answer a call and to respond to absence or presence of a subsequently dialed-in security code. Only when that code is dialed will the call be completed by effecting a through connection and causing the set to ring. This private unlisting automatically restricts accepting of calls only from callers to whom the code was given.

3 Claims, 3 Drawing Figures

TELEPHONE SECURITY SYSTEM

INTRODUCTION

The present invention relates to a telephone accessory and is particularly designed to block incoming phone calls by unauthorized callers.

In accordance with the present invention, it is suggested to interpose a unit between a subscriber's outlet and his telephone, which unit answers any incoming call at first and monitors whether the caller dials in a security, protection or access code. If not, the unit just disconnects again; if the caller does dial-in the code, the unit permits the call to pass, in particular, it will trigger a ringing circuit which is now allowed to operate the telephones ringing system. The unit as presently proposed may be part of, incorporated in or connected to an automatic answering device. This answering device responds to ringing signals and answers. The message being played back may invite the caller to leave a message or to dial in the requisite code. If the caller does the latter, the answering device is bypassed and the call goes through. The subscriber will simply cause the invitation to dial-in the code not to be played back when the answering device is to answer exclusively.

It can thus be seen that the unit protects the privacy of the subscriber better than a so-called unlisted number, because it is exclusively under his control which calls will actually reach him.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a subscriber outlet 1 and his telephone 2. These are not directly interconnected, but the connection leads through a unit 10 in accordance with the preferred embodiment. Unit 10 includes a connection circuit 3. One of the lines of circuit 3 leads straight through, but the other line contains two switches 4 and 5 pertaining to relays 14 and 15 which are normally open. A manually operable bypass switch 8 bridges switches 4 and 5 so that the user can bypass unit 10, for example, when he wants to make a call.

Figure 1:
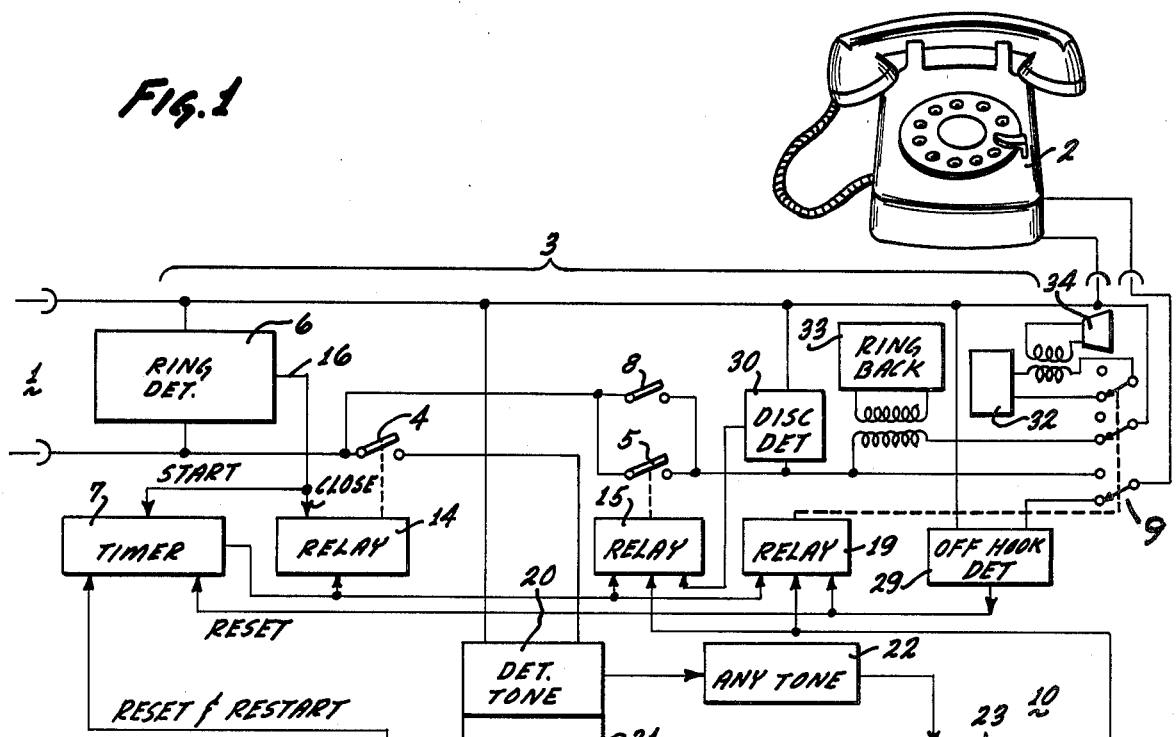
FIG. 1 is a block diagram of the system in accordance with the preferred embodiment of the invention.

A ring detector circuit 6 of unit 10 is connected across lines 3 but between the switches 4, 5, and the subscriber's outlet 1. The ring detector is of conventional design and responds to incoming ringing signals by operating an output line 16 and setting a signal into that line. The line 16 is connected to relay 14 to operate the relay for closing the switch 4 in response to an incoming call. The call is in effect answered therewith but without any response of the telephone 2. In addition, the ring detect signal is applied to a timer 7 which begins to run and unless reset will trigger relay 14 to open switch 4, so that the connection is broken again. The timer may be set for, say, ten seconds.

A tone detector 20 is connected across lines 3, but between switches 4 and 5. Thus, detector 20 is connected to the circuit only after a call has been answered by closing of switch 4. The tone detector responds to dial tone frequencies resulting from transmission of dial signals by the caller after the call has been answered. These signal frequencies represent, of course, particular digits which the caller has to dial-in in order to complete the call as far as the called party is concerned. In addition, detector 20 will include impedance means properly adjusted so that the circuit impedance now effective corresponds to the lifting of a receiver off its hook.

The detector 20 provides a one-out-of-ten signal to a re-encoder 21 which converts that signal to bcd. A detector 22 being, e.g., an OR-gate is connected also to detector 20 to determine whether or not any tone dial signal is received, and the trailing edge of the signal increments a small counter 23. Counter 23 may be a simple binary counter which is normally in count state zero, but each incrementing pulse is added.

Depending on the count state (one, two or three), counter 23 provides a gating signal to one of the three sets of gates, 24-1, 24-2 and 24-3, to load the output of the re-encoder 21 into the first, second or third set of stages in a register 25, having twelve stages accordingly. That number is, of course, arbitrary and depends on the length of the security code. Three digits are believed sufficient. Actually, it may well suffice to use only the decimal digits 0 to 7 for such a security code (for a total of 512 available numbers) so that only three binary digits are needed for each decimal digit, which reduces the needed hardware. On the other hand, for the same number of stages as illustrated, one can accommodate a four decimal digit each within the octal range only. The counter 23 and the gate logic has to be modified accordingly.

Figure 2:
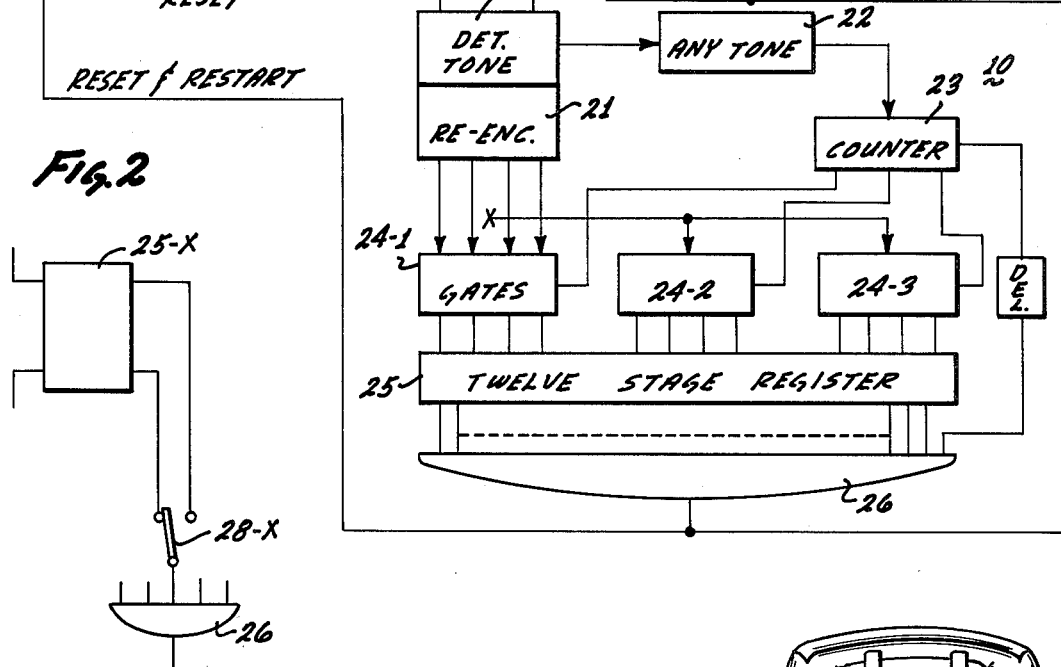
FIG. 2 illustrates a detail of the system of FIG. 1.

The register 25 is, of course, composed of latches such as 25-X in FIG. 2, and either the set or the reset side output of each latch is connected to one out of twelve inputs of an AND-gate 26. The gate 26, of course, determines absence or presence of a particular three-decimal-digit number in register 25 and provides a (logic) true output only when, in fact, the caller has dialed-in the correct number.

A delayed signal is derived from counter 23 for the count state "3" to allow for signal settling, and that signal serves as strobe signal for the detector gate 26 which is gated on when, in fact, the three digit number dialed-in is the one for which its inputs are set. In the case of agreement, a trigger signal is issued by gate 26.

First of all, the signal from gate 26 is fed to the timer 7 for resetting and restarting. If the timer 7 is not reset in that fashion, either because the wrong code was dialed-in, or the caller did not dial-in any code, then the timer 7 will trigger relay 14 to open switch 4, which, as far as the caller is concerned, simply interrupts the call and disconnects. Switch 5 was never closed in such an instance.

The primary operation function of the signal from gate 26 is to be seen in the control of operations which will alert the subscriber to the fact that (a) a call has been coming in and (b) that the call has passed the secrecy test. It must be observed, however, that as far as the telephone exchange is concerned, the call has already been answered. This means that ringing as well as ring back signals have to be generated, and the response of the subscriber by lifting the receiver of telephone 2 has to be monitored to stop the generation of ringing and ring back signals.

The signal from gate 26 activates two relays 15 and 19. Relay 15 when activated closes switch 5 which prepares the through connection. However, relay 19 opens contact 9 interrupting the through connection and to connect instead an "off-hook" detector 29 across the outgoing lines, which lead to telephone 2 to begin to monitor whether or not the user has lifted the telephone receiver (thereby changing the circuit from a high impedance to a low impedance state).

In addition, relay 19 when responding activates a tone generator 32, and a ring back tone generator 33. The ring tone generator operates a buzzer 34, being operated on a low voltage. It should be mentioned that one could provide a ring tone generator for operating the ringing circuit in telephone 2 rather than using a separate buzzer. However, it was found impractical to operate this particular system under utilization of the relatively high voltage needed to activate the ringing circuit of the telephone. The ring back generator 33 generates, e.g. a 400 cps low voltage signal, in intermittent bursts to signal to the caller that the phone is now ringing, i.e. that his dial-in of the security code yielded a successful response.

Relay 19 is deactivated when the off-hook detector 29 responds because the user has now answered the call. Accordingly, switch 9 is now placed again in the illustrated position, disconnecting the detector 29 and establishing now the final through connection between telephone 2 and the subscribers outlet 1. In addition, "ring" and ring back generators 32, 33 are deactivated. The signal from off-hook detector 29 is also used to deactivate relay 14 for opening switch 4 to remove the "off-hook" simulating impedance from the line. The third function of off-hook detector 29 is to reset timer 7 without restarting it.

Reference numeral 30 refers to a disconnect detector which monitors the voltage across the lines and responds when an "on-hook" rather high voltage is detected. The signal from disconnect detector 30 resets the unit in that in particular relay 15 is reset and deactivated.

In the foregoing it was assumed that the user does, in fact, answer the phone when the buzzer 34 rings. He may, however, not be present to do so. In this case, relay 19 will not be deactivated by the off-hook detector 29, and disconnect detector 30 is not responsive to any impedance change or absence thereof by and in telephone 2. However, it will be recalled that timer 7 was reset and restarted by the signal from gate 26 and if there was no response of the off-hook detector 29, the timer 7 was not finally reset.

The timer 7 is, therefore, permitted to run following response of the gate 26, and if the receiver of phone 2 is not lifted, the reset signal of timer 7 will become effective to reset all the relays, 14, 15 and 19.

The two units 29 and 30 could be replaced by manual switches. The switch replacing unit 29 resets timer 7, opens switch 14, and deactivates buzzer and ring back detector. The switch replacing unit 30 could manually deactivate relay 15

The unit may be provided with a hard wired securing code through a fixed connection pattern between register 25 and gate 26. This is obviously the most economical way as all of the electronics (21 to 26) readily fits on a small chip. A more sophisticated and expensive approach is to render the connection variable and adjustable as shown in FIG. 2. Particularly, one can interpose manually settable switches such as 28-X between the input of gate 26 for the X'th stage 25-X (X being 1 through 12) so that either the set or the reset output of that latch 25-X can be connected to the gate 26. Of course, one needs twelve externally accessible switches for that purpose. It may well be more economical to the user to buy another hard wired setting, i.e., a new chip, if he wishes to change his security code.

Figure 3:
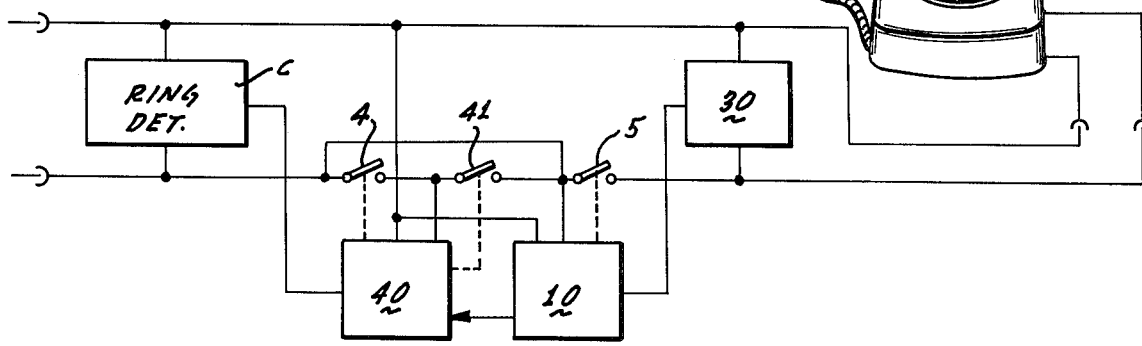
FIG. 3 is a block diagram illustrating incorporation of the unit in an automatic telephone answering device.

FIG. 3 demonstrates schematically that the security unit can be incorporated in, or otherwise used in connection with a regular telephone answering service. Such a unit must, of course, have a ring detector 6, which, however, operates in his case the answering unit 40. That unit is basically of conventional design, and the answer switch 4 in his case is operated by unit 40. The unit is now on line and usually plays back a message informing the caller that following a beep tone, he is to leave a message which will be recorded. The message in unit 40, which is being played back to the caller, may now simply be preceded by a message inviting the caller to dial-in the security code (or leave a message in the alternative). Following that, answering unit 40 closes a switch 41. If the caller now dials-in the code, the unit 10 will operate as before, closing the switch 5, and others, in addition, it stops and resets the unit 40, except for closing of switch 4 whose reopening remains under control of unit 10. The devices 19, 29, 32, 33, 34 have been omitted from this figure for the sake of clarity. If the subscriber is, in fact, not at the location of the telephone, he may before he departs, disconnect unit 10 and, possibly, reset the storage medium holding the recorded message so that the invitation to dial-in the security code will not be played back.

The invention is not limited to the embodiments described above but all changes and modifications thereof not constituting departures from the spirit and scope of the invention are intended to be included.

I claim:

1. An apparatus interposed between a telephone subscriber outlet and a telephone, comprising:
    input means including ring detector means connected to the outlet and including a first switch, the detector means responding to incoming ring signals and being connected for closing the switch, the first switch being included in a circuit which, when completed, provides a through-connection from the subscriber outlet to the telephone, the circuit and through-connection being, however, not yet completed when the first switch is closed, the circuit requires for completion that the first switch be closed as a preparation for such completion;
    means connected to be responsive to the closing of the switch and being connected to the outlet upon closing of the switch to be effective across the outlet for establishing impedance conditions equivalent to answering a phone so that ring signals arriving at the outlet will stop;
    signal-detecting means connected to the circuit as prepared by said first switch closing and being responsive to dial signals received through the outlet after closing of the first switch and after the ring signals have stopped;
    logic circuit means connected to the signal-detecting means to determine agreement between a sequence of the dial signals representing a dialed-in number and a preset number;

output means including a ring generator and a second switch operated by the logic circuit means to complete a connection from said circuit as prepared by the first switch closing, to the ring generator and causing the ring generator to generate ringing signals for the telephone when said logic circuit has detected said agreement; and means for completing the through-connection of the circuit as prepared, to extend between the outlet and the telephone following an actual answering of the telephone by a person.

2. An apparatus as in claim 1, said means for completing including another detector means connected to the telephone and responding to a change in impedance conditions indicative of whether or not the telephone has been answered.

3. An apparatus as in claim 1 or 2, wherein the generation of ringing signals is separate from the telephone, the output means including a separate ring-back generator connected to the circuit and further connected to be activated by the logic circuit means, for providing ring-back signals into the outlet.

* * * * *